(12) United States Patent
Abler et al.

(10) Patent No.: US 6,490,281 B1
(45) Date of Patent: Dec. 3, 2002

(54) APPARATUS INCLUDING A SCALABLE MULTIPROTOCOL COMMUNICATIONS ADAPTER USING MODULAR COMPONENTS AND A METHOD FOR TRANSMITTING DATA FRAMES VIA SCALABLE MULTIPROTOCOL COMMUNICATION ADAPTERS

(75) Inventors: Joseph Michael Abler, Raleigh, NC (US); William Woollcott Ellington, Jr., Raleigh, NC (US); William Gavin Holland, Cary, NC (US); Francis Edward Noel, Jr., Durham, NC (US); Lorrie Ann Tomek, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/219,007

(22) Filed: Dec. 23, 1998

Related U.S. Application Data

(60) Provisional application No. 60/087,964, filed on Jun. 4, 1998.

(51) Int. Cl.$^7$ ................................................. H04L 12/28
(52) U.S. Cl. ....................................... 370/394; 370/473
(58) Field of Search ................................. 370/474, 535, 370/506, 401, 402, 285, 467, 394, 466, 389, 449, 447, 461, 462, 463, 395.5, 395.53, 419, 420, 421, 473; 709/213

(56) References Cited

U.S. PATENT DOCUMENTS

| | | | | |
|---|---|---|---|---|
| 5,440,545 A | * | 8/1995 | Buchholz et al. | 370/426 |
| 5,754,540 A | * | 5/1998 | Lie et al. | 370/315 |
| 5,781,549 A | * | 7/1998 | Dai | 370/398 |
| 6,034,957 A | * | 3/2000 | Haddock et al. | 370/392 |
| 6,108,692 A | * | 8/2000 | Van Seters et al. | 709/213 |

\* cited by examiner

*Primary Examiner*—Chau Nguyen
*Assistant Examiner*—Alexander O. Boakye
(74) *Attorney, Agent, or Firm*—Gerald Woods; J. Bruce Schelkopf

(57) ABSTRACT

A programmable multispeed communication apparatus includes a plurality of identical media access control (MAC) units for use with a programmable data processing system. The MAC units when multiplexed and connected to a communication media achieve a transmission speed n·s where n is the number of MAC units and s is the speed of the individual MACs. If one or more but not all of the MAC units fail, the apparatus will operate in degraded mode with the remaining active MAC units. User frames are sequentially numbered, partitioned into sequentially numbered partitions which are assigned to one or more MAC's. Each of the partitions includes a prefix which includes the sequential frame number, the sequential partition number and an indicator for distinguishing the last partition of a frame from the other partitions of that frame.

18 Claims, 3 Drawing Sheets

FIG. 3      Transmit Flow

Receive Flow

APPARATUS INCLUDING A SCALABLE MULTIPROTOCOL COMMUNICATIONS ADAPTER USING MODULAR COMPONENTS AND A METHOD FOR TRANSMITTING DATA FRAMES VIA SCALABLE MULTIPROTOCOL COMMUNICATION ADAPTERS

This application claims the benefit of Ser. No. 60/087,964, filed Jun. 4, 1998.

BACKGROUND

Communication adapters typically act as an interface between a data processing device and a communication media such as employed in Token Ring and Ethernet for example. Initially these adapters handled only a singe protocol and a single transmission speed. More recently multispeed (4/16 Token Ring and 10/100 Ethernet) adapters have been introduced. The advent of the multispeed adapters has resulted in substantial savings in distribution and support expense, however, additional substantial savings could be realized in manufacturing if programmable adapters with a wide range of speeds were available which used common modular components to achieve the wide range of speeds.

SUMMARY OF THE INVENTION

The invention contemplates programmable multispeed communication adapters constructed from common or identical modular components which will also provide degraded performance in the presence of failure in one or more but not all of the common modular components. More specifically, the invention contemplates the use of two or more identical or common Media Access Control (MAC) devices to achieve a range of speeds (n.s) where n is the number of common MAC devices utilized and s is the speed of the identical MAC devices used. A data stream (or user frame of data) from a sending user program is partitioned by a device driver and selectively assigned to the n MAC units. The individual MAC units move assigned data from storage buffers into a multiplexer where it is transmitted over the transmission medium. The device driver inserts unique information in the buffered partitions of the user frame which enables a receiving device driver to reassemble the user frame in its original form for delivery to the destination user.

DETAILED DESCRIPTION OF THE INVENTION

Figure 1:
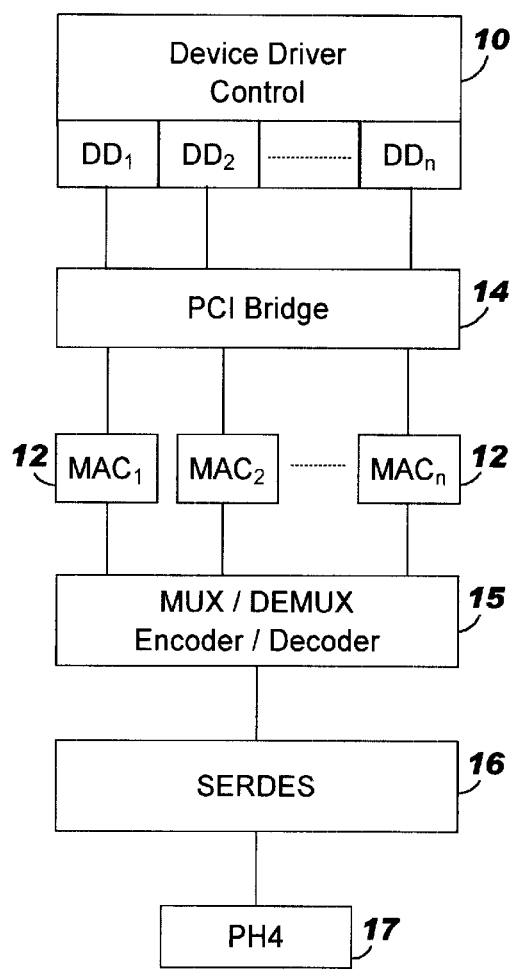
FIG. 1 is a block diagram of a modular communications adapter constructed according to the invention and of those unique components of a data processing system which control the novel modular adapter.

In FIG. 1 device driver control code 10 resident in a data processing system, transmit/receives data frames, over a physical media 11, from/to user programs also resident in the data processing system, to/from a remote system not shown in the drawing. Since the illustrated modular adapter has n identical or common media access control (MAC) devices, device driver control 10 includes n functionally identical sub-modules DD1–DDn. Each of these sub-modules communicates with one of n MAC's 12 via a PCI bus 13 and a bridge 14. The MAC's are connected to the physical media 11 by a multiplexer/demultiplexer (mux/demux) 15 which also provides encoding/decoding of the transmit/receive signal and a serializer/deserializer 16 which converts parallel signals to serial signals for transmission over the physical media and serial signals received from the media to parallel signals for use in the data processing system.

Figure 2:
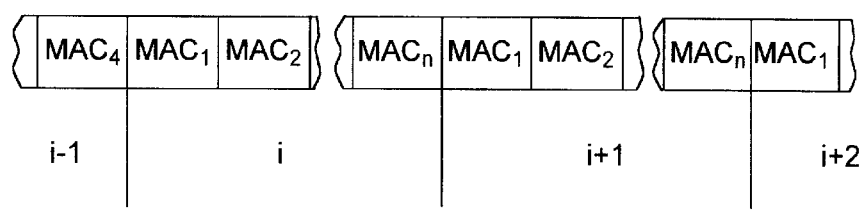
FIG. 2 is a diagram illustrating an epoch of the signals transmitted over the physical media.

Only a small portion of the signal transmitted on the physical media is illustrated in FIG. 2. Two consecutive epochs i and i+1 are illustrated. Each epoch includes n segments (one for each MAC). Each segment of each epoch is allocated a fixed number of signal elements. The signals on the media will include framing or synchronization signals, not shown, for identifying the position of each segment in the epochs.

In a typical transmit operation the device driver control 10 receives user data frames from users resident in the data processing system which are directed to remote users on a data processing system connected to the physical media 11. The driver 10 assigns consecutive user frame numbers to the received user frames. It partitions the user frame data into one or more buffers depending upon the user frame length and potentially on traffic patterns and loads. It adds two bytes of information as a prefix to each of the data buffers. The first byte includes a seven bit sequentially assigned user frame sequence number and a one bit, last-buffer-in-user-frame designation which when set identifies that buffer as the last buffer in a user frame. The second byte of the prefix contains a sequentially assigned buffer sequence number.

The device driver control 10 queues each buffer as a complete MAC frame to one of the MAC's. A user frame which include more than one buffer may be queued as set of MAC frames to the same or different MAC's. The distribution of the buffers amongst the MAC's is not fixed. It is motivated by a desire to balance the traffic load overall of the MAC's. This can be accomplished by maintaining a record of the queued buffer length or depth of each of the MAC's and assigning buffers to those MAC's having the smallest queue length or depth.

The device driver sub-modules build a complete MAC frame for each buffer assigned to the associated MAC. It prepares a MAC header which includes the Destination Address (DA) of the MAC which is to receive the MAC frame, the Source Address (SA) of the MAC which is to transmit the MAC frame and a Length (L) which includes the DA, SA, L, the length the buffered data and a four byte field at the end of the buffer to contain a four byte CRC field generated by the transmitting MAC device.

Before transmission of data begins the two systems connected to the media must be initialized. This includes identifying the MAC DA/SA pairs and the segment within the epoch dedicated to data transfer between the paired MAC's. This is readily accomplished by the device drivers exchanging information over the media. The only information needed is the MAC address of the individual MAC device assigned to each segment in the epoch. If a MAC fails, the system can continue to operate with the remaining operating MAC's. This is accomplished by initializing the system without the failed MAC and its partner in the other system. This will result in less throughput, however the system will continue to operate.

At the receiver, which is structurally identical to the system illustrated in FIG. 1, the signal received from the media 11 is converted to parallel form and sent to the mux/demux 15. The MAC frame is constructed from the received signal and distributed to the appropriate MAC's. MAC frames from transmitting MAC 1 are applied to receiving MAC 1. At initialization these MAC's were paired and the DA used by the transmitting MAC 1 is recognized by the receiving MAC 1. The remaining MAC's are similarly paired and utilize the previously paired DA/SA addresses.

The receiving MAC's treat each buffer as a complete frame since the device driver at the transmitter configured the buffers as complete MAC frames. The MAC's pass the complete MAC frames over the PCI bus bridge to the receiving system device driver.

The receiving device driver manages receive operations by monitoring the information user frame sequence number, buffer sequence number and last buffer in user frame indication included in each of the MAC frames transmitted by the sending MAC's. If a buffer for a new user frame is received, the receive driver builds a record for the new user frame. The record includes the user frame sequence number, the buffer sequence numbers and the End of Frame (EoF) buffer number (this number corresponds to the buffer number of a user frame in which the last buffer in user frame indication is set). The device driver also initiates a timeout counter for that user frame so that buffers lost in transmission can be detected.

Figure 3:
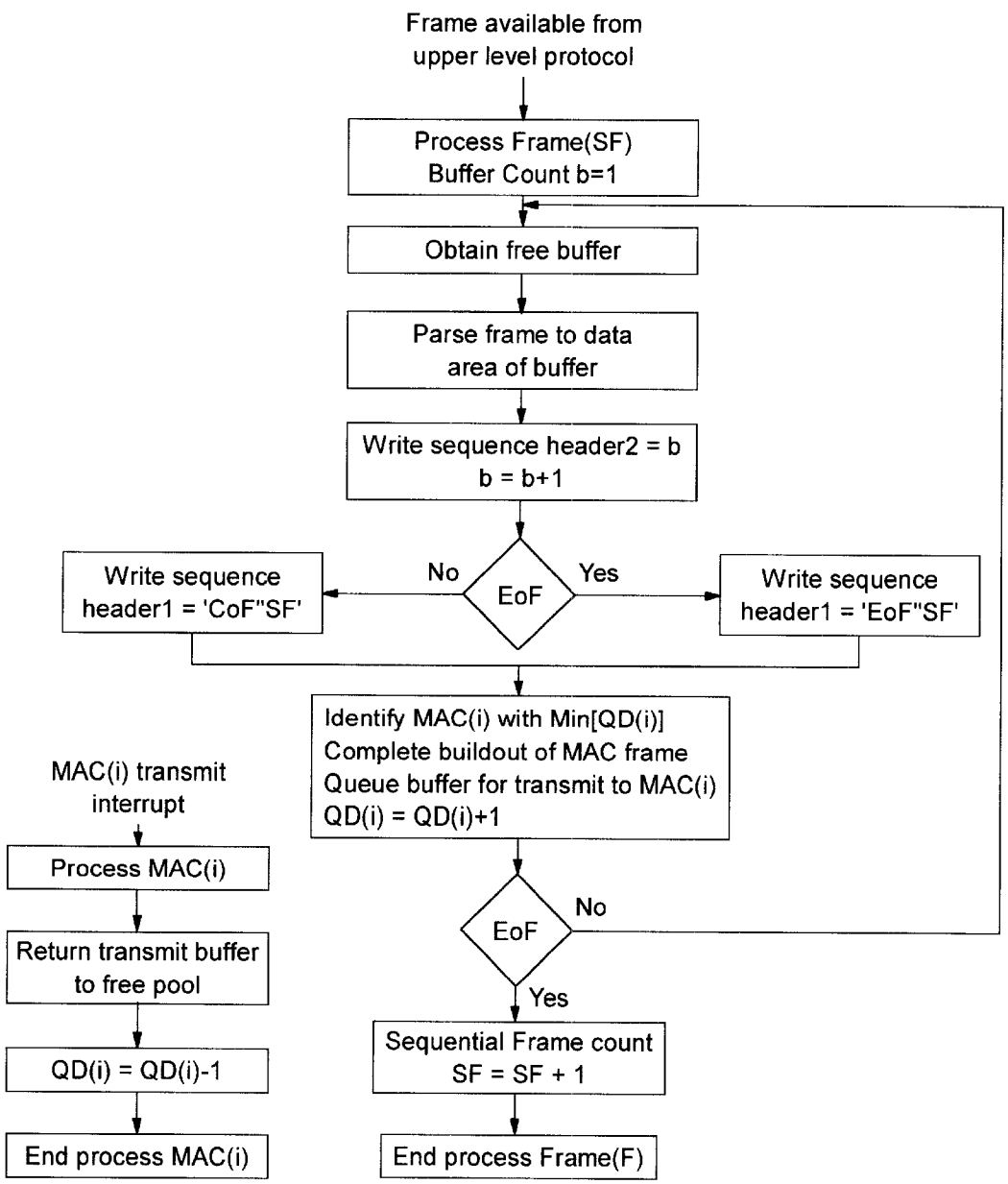
FIG. 3 is a flow diagram of the transmit portion of the novel communication device driver resident in the data processing system; and, FIG. 4 is a flow diagram of the receive portion of the novel communications device driver resident in the data processing system.
Figure 4:
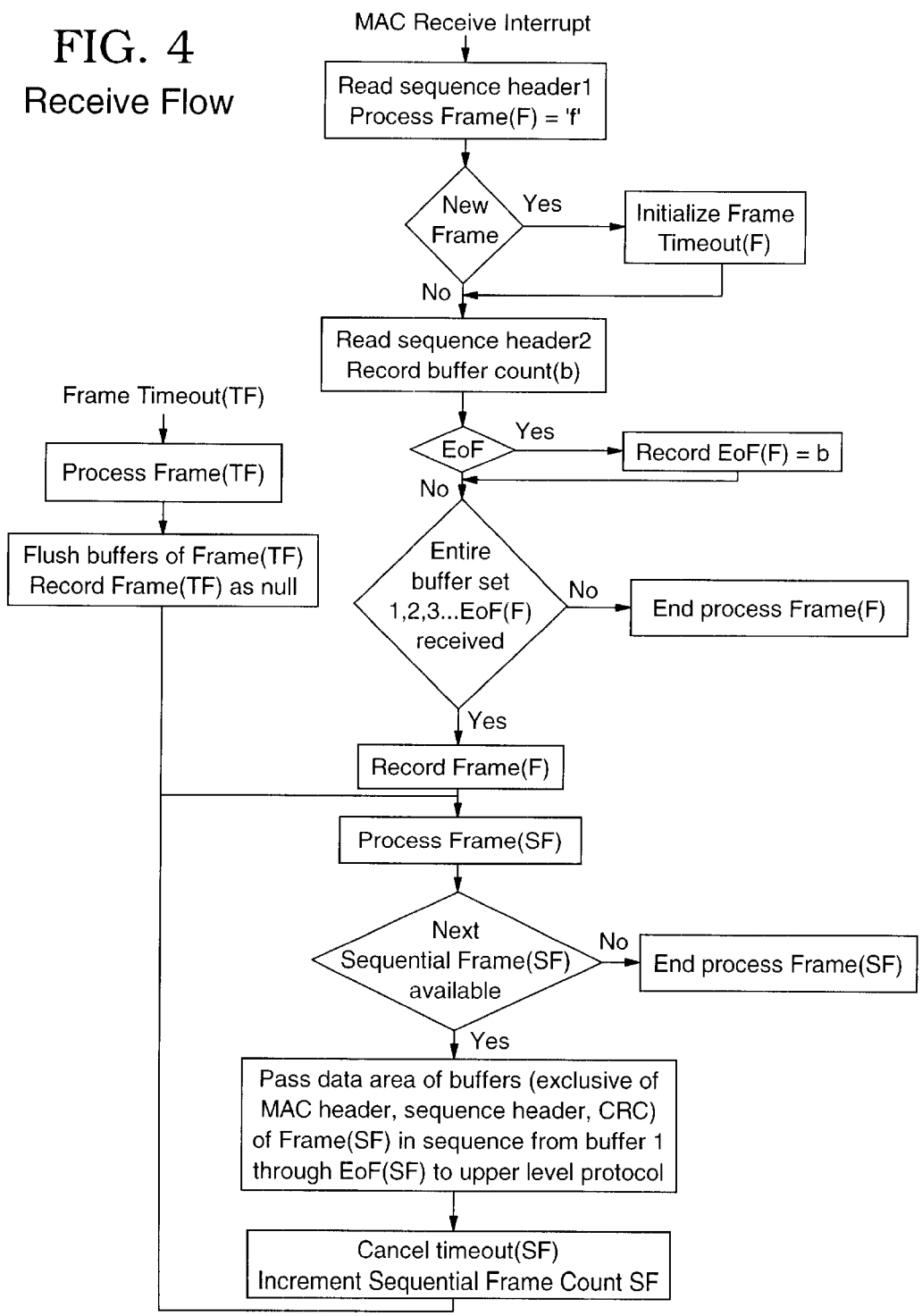

It then records the buffer sequence number and checks to see if the MAC frame is an EoF. If it is an EoF this is noted in the record. It then checks the record to determine if all buffers of that user frame have been received. If they have not all been received, processing ends. If all buffers of that user frame have been received the user frame is recorded as complete and the record is checked to see if next complete user frame in the sequence of user frames is complete. If not, the process ends. If the next complete user frame in the sequence of user frames is complete the user data in the buffer sequence (from buffer 1–the buffer EoF) are passed to the user via upper layer protocols. The timeout is canceled and the buffers are flushed.The flow diagrams illustrated in FIGS. 3 and 4 are graphical representations of the description set forth above.

While specific embodiments of the invention has been described in detail by way of example, it should be apparent to those skilled in the art to which the invention pertains that the invention is not limited to those embodiments only, but on the contrary, the invention is intended to cover all alternatives, modifications and equivalents falling within the spirit and scope of the invention as defined by the claims.

What is claimed is:

1. A method for preparing user data frames received from a data processing system for transmission over a communication media by a programmable multispeed communication adapter which includes a plurality of common MAC devices comprising the steps:

receiving at least one user frame from a sending user program in the data processing system;

partitioning the user frame into a plurality of partitions;

preparing a prefix for each partition which includes control information for reassembling the partitions at a remote receiver;

selectively assigning the partitioned data amongst the plurality of MAC devices; and initiating transfer of the assigned partitions by the assigned MAC devices, whereby, the transmission speed is increased in proportion to the number of assigned MAC devices.

2. The method set forth in claim 1 in which each partition of said user frame is transmitted by the assigned MAC device as a complete MAC frame.

3. The method set forth in claim 2 in which each of the received user frames is assigned a sequential user frame number which is included in the prefix of each partition of that frame to identify the partition as a part of a particular user frame.

4. The method set forth in claim 3 in which each partition of a user frame is assigned a sequential partition number which is included in the prefix of each partition of that frame to identify the sequence of the partitions in the user frame identified by the sequential user frame number.

5. The method set forth in claim 4 in which the prefix of each partition is provided with an indicator for identifying the last partition in a user frame.

6. A method for preparing user data frames received from a data processing system for transmission over a communication media by a programmable multispeed communication adapter which includes a plurality of common MAC devices comprising the steps:

receiving user frames from a sending user program in the data processing system;

assigning a sequential user frame number to each of the user frames;

partitioning each received user frame into one or more partitions;

assigning a sequential partition number to each partition of a user frame;

preparing a prefix for each partition which includes the sequential user frame number, the sequential partition number of the partition and an indicator for distinguishing the last sequential partition in a user frame;

selectively assigning the partitioned data amongst the plurality of MAC devices; and initiating transfer of the assigned partitions by the assigned MAC devices.

7. The method set forth in claim 6 in which each partition of a user frame is transmitted by the assigned MAC device as a complete MAC frame.

8. A programmable multispeed communication adapter constructed from common modular components for use with a programmable data processing system, the adapter providing degraded performance in the presence of a failure in one or more but not all of the common modular components comprising:

a plurality of common Media Access Control (MAC) devices for receiving user frames from the data processing system and preparing the received user frames for transmission over a communication media and in which the plurality of MAC devices achieve a range of data transmission speeds approximating (n·s) where n is the number of common MAC devices utilized and s is the speed of the identical MAC devices used;

a device driver control element for connecting MAC devices to a programmed data processing system;

a multiplexer for receiving data signals from the MAC devices and arranging the received data signals in a predetermined order; and, a serializer for receiving the multiplexed data signals from the multiplexer and serializing them for transmission over a data transmission media.

9. Apparatus including a programmable multispeed communication adapter constructed from a plurality of common modular components for use with a programmable data processing system, said apparatus providing degraded performance in the presence of a failure in one or more but not all of the common modular components comprising:

driver receive logic for receiving user frames from a sending user program resident in the data processing system;

frame partitioning logic for partitioning each received user frame into one or more partitions;

partition formatting logic for preparing a prefix for each partition which includes control information for reassembling the partitions at a remote receiver;

partition distribution logic for selectively assigning the partitions of the user frame amongst the plurality of common modular components;

transmit logic for initiating transfer of signals corresponding to the assigned partitions by the assigned common modular components;

a multiplexer for receiving signals corresponding to the assigned user frame partitions from the common modular components and arranging the received signals in a predetermined order; and, a serializer for receiving the multiplexed signals from the multiplexer means and serializing them for transmission over a transmission media.

10. The apparatus set forth in claim 9 in which each of the common modular components includes media access control devices.

11. The apparatus set forth in claim 10 in which each assigned partition of a user frame is transmitted by the assigned MAC device as a complete MAC frame.

12. The apparatus set forth in claim 11 in which each of the received user frames is assigned a sequential user frame number which is included in the prefix of each partition of that frame to identify the partition as a part of a particular user frame.

13. The apparatus set forth in claim 12 in which each partition of a user frame is assigned a sequential partition number which is included in the prefix of each partition of that frame to identify the sequence of the partitions in the user frame identified by the sequential user frame number.

14. The apparatus set forth in claim 13 in which the prefix of each partition is provided with an indicator for identifying the last partition in a user frame.

15. Apparatus including a programmable multispeed communication adapter constructed from a plurality of common modular components for use with a programmable data processing system and which provides degraded performance in the presence of a failure in one or more but not all of the common modular components comprising:

receiving logic for receiving user frames from a sending user program resident in the data processing system, for assigning a sequential user frame number to each user frame received, for partitioning each received user data frame into one or more partitions and for assigning a sequential partition number to the partitions;

partition formatting logic for preparing a prefix for each partition which includes the sequential user frame number, the sequential partition number of the partition and an indicator for identifying the last partition in a user frame;

partition distribution logic for selectively assigning the partitions of a user frame amongst the plurality of common modular components;

transmit logic for initiating transfer of the assigned partitions by the assigned common modular components;

a multiplexer for receiving signals corresponding to the assigned partitions of the user frame from the common modulator components and arranging the received signals in a predetermined order; and, a serializer for receiving the multiplexed signals from the multiplexer means and serializing them for transmission over a data transmission media.

16. A method for preparing user data frames received from a data processing system for transmission over a communication media by a programmable multispeed communication adapter which includes a plurality of common MAC devices comprising the steps:

receiving at least one user frame from a sending user program in the data processing system;

assigning each of said user frames a sequential user frame number;

partitioning said user frame into a plurality of partitions;

preparing a prefix for each partition of a user frame which includes control information and said sequential user frame number to identify the partition with respect to said user frame for reassembling the plurality of partitions at a remote receiver;

selectively assigning the partitioned data amongst the plurality of said MAC devices; and initiating transfer of said assigned partitions by the assigned plurality of MAC devices wherein each partition of said user frame is transmitted by each of said assigned MAC device as a complete MAC frame whereby the transmission speed is increased in proportion to the number of assigned MAC devices.

17. The method set forth in claim 16 further comprising the step of:

assigning each partition of said user frame a sequential partition number wherein said partition prefix further comprises said partition number such that the original user frame can be reassembled at the receiving device with respect to a reassembly sequence from the sequential partition number.

18. The method set forth in claim 17 in which the prefix for each partition of a user frame further comprises an indicator for identifying a last partition in a user frame.

* * * * *